US008269424B2

United States Patent
Terashima

(10) Patent No.: US 8,269,424 B2
(45) Date of Patent: Sep. 18, 2012

(54) DISCHARGE LAMP LIGHTING DEVICE, PROJECTOR, AND DRIVING METHOD OF DISCHARGE LAMP

(75) Inventor: Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 12/832,159

(22) Filed: Jul. 8, 2010

(65) Prior Publication Data
US 2011/0012525 A1 Jan. 20, 2011

(30) Foreign Application Priority Data
Jul. 17, 2009 (JP) ................................ 2009-168975

(51) Int. Cl.
H05B 37/00 (2006.01)
(52) U.S. Cl. ......................... 315/246; 315/307; 315/308
(58) Field of Classification Search .............. 315/209 R, 315/224, 246, 287, 291, 307, 308
See application file for complete search history.

(56) References Cited

U.S. PATENT DOCUMENTS

| | | | |
|---|---|---|---|
| 4,912,374 A * | 3/1990 | Nagase et al. ................ 315/244 |
| 7,023,144 B2 | 4/2006 | Suzuki et al. | |
| 7,170,237 B2 | 1/2007 | Suzuki et al. | |
| 2008/0116820 A1 * | 5/2008 | Ozasa et al. .................. 315/246 |
| 2010/0128232 A1 * | 5/2010 | Kagata et al. .................. 353/85 |
| 2010/0194311 A1 * | 8/2010 | Terashima .................... 315/307 |

FOREIGN PATENT DOCUMENTS

| | | |
|---|---|---|
| JP | 1-112698 A | 5/1989 |
| JP | 1-217893 A | 8/1989 |
| JP | 2003-059684 A | 2/2003 |
| JP | 2006-059790 A | 3/2006 |
| JP | 2006-332015 A | 12/2006 |

\* cited by examiner

Primary Examiner — Douglas W Owens
Assistant Examiner — Amy Yang
(74) Attorney, Agent, or Firm — AdvantEdge Law Group, LLC

(57) ABSTRACT

In at least one embodiment of the disclosure, a discharge lamp lighting device comprises a discharge lamp driving section, a state detecting section that detects a deterioration state of an electrode of a discharge lamp, and a control unit. The control unit alternately performs a first DC driving processing and a first AC driving processing in a first section of the driving current. The control unit alternately performs a second DC driving processing and a second AC driving processing in a second section of the driving current different from the first section. According to a progress of the deterioration state of the electrode, the control unit increases a length of at least one of: (i) a period for which the first DC driving processing is performed, and (ii) a period for which the second DC driving processing is performed.

17 Claims, 11 Drawing Sheets

FIG. 5A
FIRST POLARITY STATE P1
FIG. 5B
SECOND POLARITY STATE P2
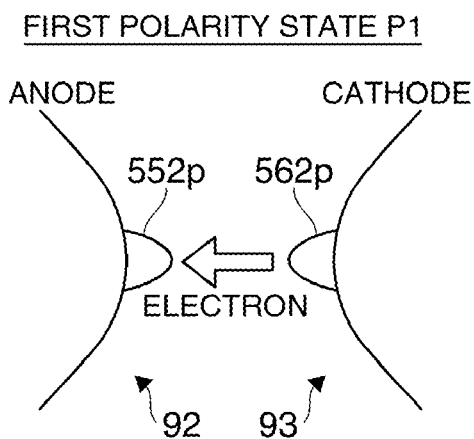
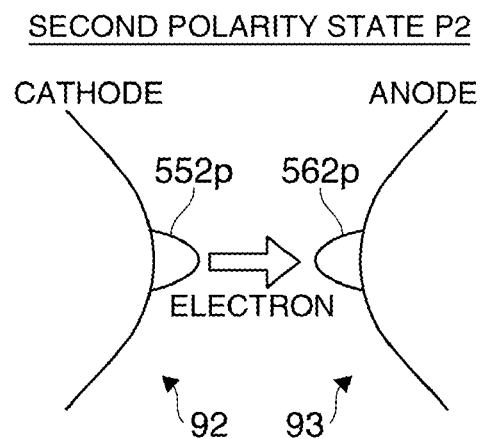
FIG. 5C
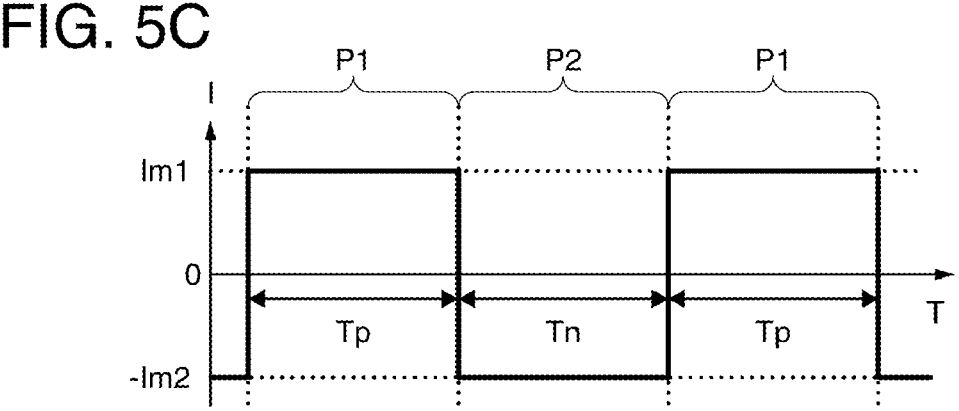
FIG. 5D
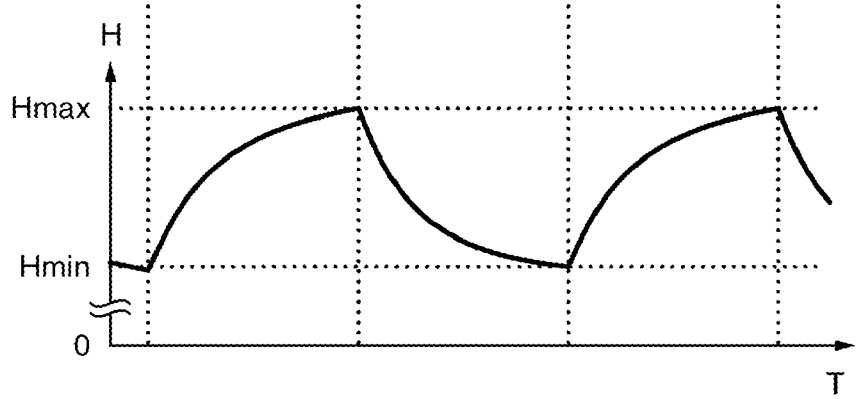

FIG. 9A

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0036 | 0.015 | 204 |
| EQUAL TO OR LARGER THAN 85 AND SMALLER THAN 100 | 0.0071 | 0.015 | 204 |
| EQUAL TO OR LARGER THAN 100 | 0.0107 | 0.015 | 204 |

FIG. 9B

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0071 | 0.020 | 204 |
| EQUAL TO OR LARGER THAN 85 AND SMALLER THAN 100 | 0.0071 | 0.015 | 204 |
| EQUAL TO OR LARGER THAN 100 | 0.0071 | 0.010 | 204 |

FIG. 9C

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0036 | 0.020 | 204 |
| EQUAL TO OR LARGER THAN 85 AND SMALLER THAN 100 | 0.0071 | 0.015 | 204 |
| EQUAL TO OR LARGER THAN 100 | 0.0107 | 0.010 | 204 |

FIG. 9D

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0036 | 0.022 | 68 |
| EQUAL TO OR LARGER THAN 85 AND SMALLER THAN 100 | 0.0071 | 0.022 | 136 |
| EQUAL TO OR LARGER THAN 100 | 0.0107 | 0.022 | 272 |

FIG. 9E

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0071 | 0.044 | 68 |
| EQUAL TO OR LARGER THAN 85 AND SMALLER THAN 100 | 0.0071 | 0.022 | 136 |
| EQUAL TO OR LARGER THAN 100 | 0.0071 | 0.011 | 272 |

FIG. 9F

| DRIVING VOLTAGE [V] | DC TIME [s] | AC TIME [s] | FREQUENCY [Hz] |
|---|---|---|---|
| EQUAL TO OR LARGER THAN 65 AND SMALLER THAN 85 | 0.0036 | 0.044 | 68 |
| EQUAL TO OR LARGER THAN 85 AND SMALLER THAN 100 | 0.0071 | 0.022 | 136 |
| EQUAL TO OR LARGER THAN 100 | 0.0107 | 0.011 | 272 |

FIG. 10A
| DRIVING VOLTAGE [V] | DC TIME [s] | AC TIME [s] | FREQUENCY MODULATION PATTERN [Hz] |
|---|---|---|---|
| SMALLER THAN 90 | 0.0071 | 0.027 | 68→136→204 |
| EQUAL TO OR LARGER THAN 90 | 0.0071 | 0.018 | 272→204→102 |
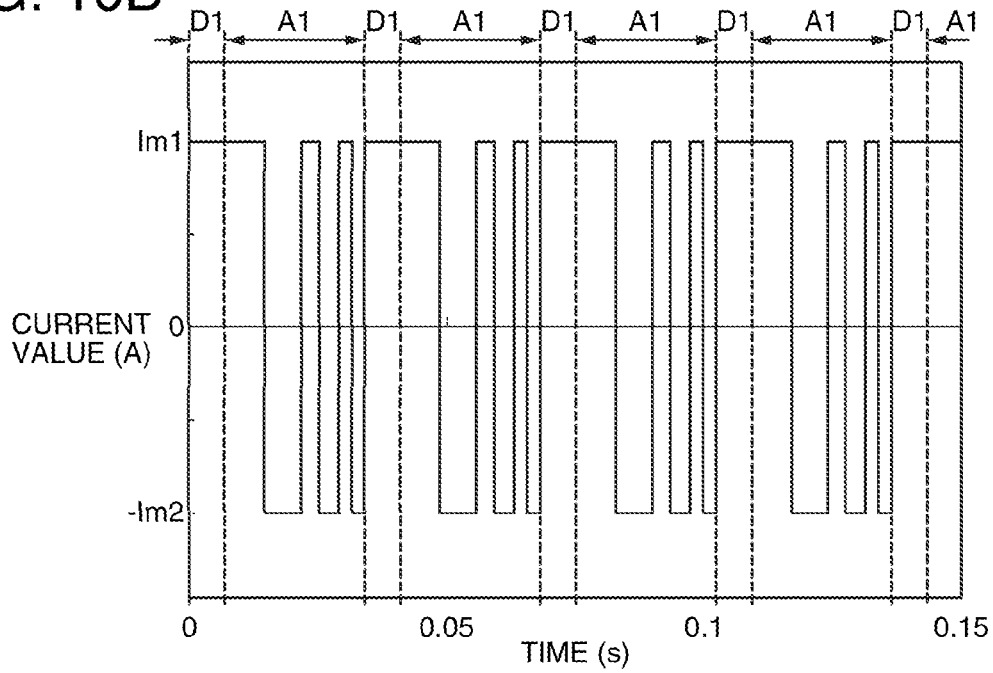
FIG. 10B
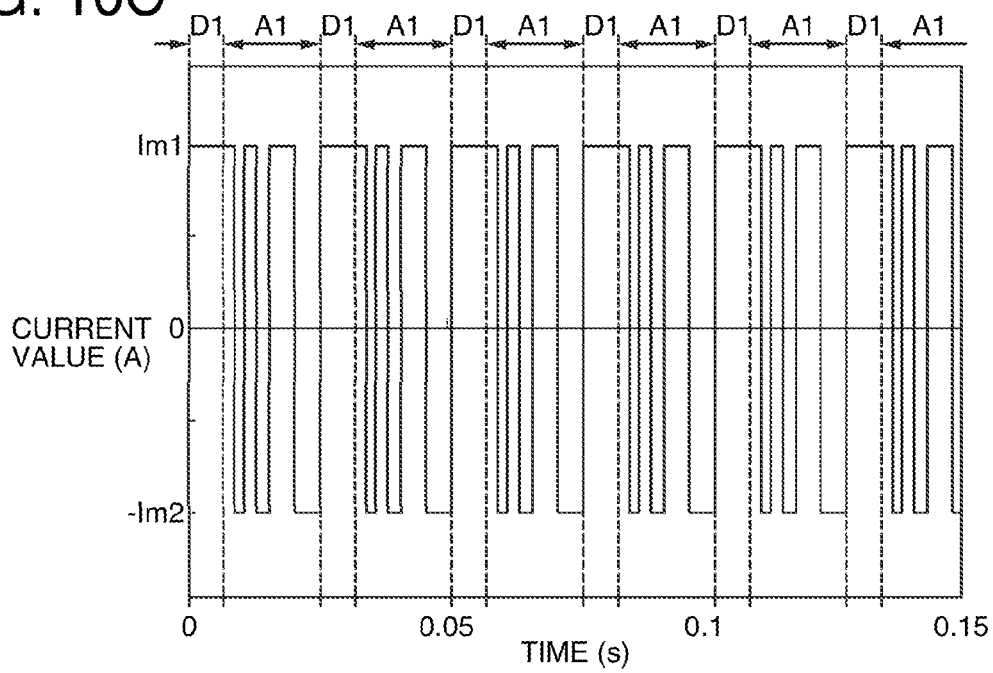
FIG. 10C

DISCHARGE LAMP LIGHTING DEVICE, PROJECTOR, AND DRIVING METHOD OF DISCHARGE LAMP

CROSS-REFERENCE

The present application claims priority from Japanese Patent Application No. 2009-168975 filed on Jul. 17, 2009 which is hereby incorporated by reference in its entirety.

BACKGROUND

Discharge lamps, such as high-pressure mercury lamps or metal halide lamps, have been used as light sources of a projector. In these discharge lamps, the shape of an electrode changes due to a drop in fusibility resulting from consumption of the electrode by discharge or progress of crystallization of the electrode according to an increase in cumulative lighting time. In addition, when a plurality of projections grows in an electrode tip portion or irregular consumption of the electrode body progresses by those described above, the arc origin moves or the arc length changes. Such phenomena are not desirable because they reduce the brightness of a discharge lamp so that the lifespan of the discharge lamp is reduced.

In order to solve the problem, a discharge lamp lighting device that supplies a driving current, in which a low frequency is intermittently inserted in a steady-state frequency, to a discharge lamp is known (see, e.g., JP-A-2006-332015). In addition, a discharge lamp lighting device that supplies a driving current, in which a direct current is intermittently inserted in a high-frequency alternating current, to a discharge lamp is known (see, e.g., JP-A-1-112698).

However, even if a discharge lamp is driven under the same driving conditions, the growth degree or the melting degree of a projection of an electrode tip portion which becomes an arc origin changes with a deterioration state of the electrode. For example, when the melting degree of an electrode tip portion is not sufficient, a projection of the electrode tip portion may deform. Moreover, when the melting degree of the electrode tip portion is excessive, an electrode material may evaporate excessively to cause blackening or needle-like crystals. Therefore, particular consideration is required in order to maintain the shape of the projection of the electrode tip portion.

SUMMARY

Various embodiments of the disclosure provide a discharge lamp lighting device capable of suppressing the deformation of an electrode of a discharge lamp, a projector, and a driving method of a discharge lamp.

According to an aspect of the disclosure, there is provided a discharge lamp lighting device including: a discharge lamp driving section that supplies a driving current to an electrode of a discharge lamp to drive the discharge lamp; a state detecting section that detects a deterioration state of the electrode; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component at a first frequency, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component at a second frequency, as the driving current in the second AC driving processing. The control unit increases the length of at least one of a period, for which the first DC driving processing is performed, and a period, for which the second DC driving processing is performed, according to progress of the deterioration state.

The state detecting section may detect a driving voltage of the discharge lamp, a temporal change in the driving voltage of the discharge lamp, the amount of light of the discharge lamp, a temporal change in the amount of light of the discharge lamp, and a cumulative lighting time of the discharge lamp as a value indicating the degree of the deterioration state, for example.

The first direct current may be a current pulse having a first polarity component multiple times, and the second direct current may be a current pulse having a second polarity component multiple times.

According to the discharge lamp lighting device described above, since the length of at least one of the period for which the first DC driving processing is performed and the period for which the second DC driving processing is performed is increased according to the progress of the deterioration state, it becomes easy to melt an electrode which is provided in a discharge lamp and which becomes difficult to melt with the progress of a deterioration state of the electrode. As a result, deformation of the electrode of the discharge lamp can be suppressed.

In the discharge lamp lighting device described above, the control unit may decrease the length of at least one of a period, for which the first AC driving processing is performed, and a period, for which the second AC driving processing is performed, according to the progress of the deterioration state.

According to the discharge lamp lighting device described above, since the length of at least one of the period for which the first AC driving processing is performed and the period for which the second AC driving processing is performed is decreased according to the progress of the deterioration state, it becomes easier to melt an electrode which is provided in a discharge lamp and which becomes difficult to melt with the progress of a deterioration state of the electrode. As a result, deformation of the electrode of the discharge lamp can be suppressed.

According to another aspect of the disclosure, there is provided a discharge lamp lighting device including: a discharge lamp driving section that supplies a driving current to an electrode of a discharge lamp to drive the discharge lamp; a state detecting section that detects a deterioration state of the electrode; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component at a first frequency, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component at a second frequency, as the driving current in the second AC driving processing. The control unit decreases the length of at least one of a period, for which the first AC driving processing is performed, and a period, for which the second AC driving processing is performed, according to progress of the deterioration state.

According to the discharge lamp lighting device described above, since the length of at least one of the period for which the first AC driving processing is performed and the period for which the second AC driving processing is performed is decreased according to the progress of the deterioration state, it becomes easy to melt an electrode which is provided in a discharge lamp and which becomes difficult to melt with the progress of a deterioration state of the electrode. As a result, deformation of the electrode of the discharge lamp can be suppressed.

In the discharge lamp lighting device described above, when the deterioration state is smaller than a first reference value, the control unit may change the first frequency from low frequency to high frequency during a period for which the first AC driving processing is performed and may change the second frequency from low frequency to high frequency during a period for which the second AC driving processing is performed.

According to the discharge lamp lighting device, when the deterioration state is smaller than the first reference value, the first frequency is changed from low frequency to high frequency during a period for which the first AC driving processing is performed and the second frequency is changed from low frequency to high frequency during a period for which the second AC driving processing is performed. As a result, it is possible to make a projection grow stably when the deterioration state is not in progress.

In the discharge lamp lighting device described above, when the deterioration state is equal to or larger than a second reference value, the control unit may change the first frequency from high frequency to low frequency during a period for which the first AC driving processing is performed and may change the second frequency from high frequency to low frequency during a period for which the second AC driving processing is performed.

According to the discharge lamp lighting device, when the deterioration state is equal to or larger than the second reference value, the first frequency is changed from high frequency to low frequency during a period for which the first AC driving processing is performed and the second frequency is changed from high frequency to low frequency during a period for which the second AC driving processing is performed. As a result, it is possible to ensure an arc origin early when the deterioration state is in progress.

In the discharge lamp lighting device described above, the control unit may increase at least one of the first and second frequencies according to the progress of the deterioration state.

According to the discharge lamp lighting device, at least one of the first and second frequencies is increased according to the progress of the deterioration state. As a result, a projection can grow stably when the deterioration state is not in progress, and the arc origin can be ensured early when the deterioration state is in progress.

According to still another aspect of the disclosure, there is provided a projector including one of the discharge lamp lighting devices described above.

According to the projector, it becomes easy to melt an electrode which is provided in the discharge lamp and which becomes difficult to melt with the progress of a deterioration state of the electrode. As a result, deformation of the electrode of the discharge lamp can be suppressed.

According to yet another aspect of the disclosure, a driving method of a discharge lamp that lights by supply of a driving current to an electrode of a discharge lamp includes: detecting a deterioration state of the electrode and performing first DC driving and first AC driving alternately in a first section; detecting a deterioration state of the electrode and performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component at a first frequency, as the driving current in the first AC driving; supplying a second direct current, which starts from a second polarity and has a second polarity component, as the driving current in the second DC driving; supplying a second alternating current, which repeats a first polarity component and a second polarity component at a second frequency, as the driving current in the second AC driving; and increasing the length of at least one of a period, for which the first DC driving is performed, and a period, for which the second DC driving is performed, according to progress of the deterioration state.

According to the driving method of the discharge lamp described above, since the length of at least one of the period for which the first DC driving is performed and the period for which the second DC driving is performed is increased according to the progress of the deterioration state, it becomes easy to melt an electrode which is provided in a discharge lamp and which becomes difficult to melt with the progress of a deterioration state of the electrode. As a result, deformation of the electrode of the discharge lamp can be suppressed.

According to still yet another aspect of the disclosure, a driving method of a discharge lamp that lights by supply of a driving current to an electrode of a discharge lamp includes: detecting a deterioration state of the electrode and performing first DC driving and first AC driving alternately in a first section; detecting a deterioration state of the electrode and performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component at a first frequency, as the driving current in the first AC driving; supplying a second direct current, which starts from a second polarity and has a second polarity component, as the driving current in the second DC driving; supplying a second alternating current, which repeats a first polarity component and a second polarity component at a second frequency, as the driving current in the second AC driving; and decreasing the length of at least one of a period, for which the first AC driving is performed, and a period, for which the second AC driving is performed, according to the progress of the deterioration state.

According to the driving method of the discharge lamp described above, since the length of at least one of the period for which the first AC driving is performed and the period for which the second AC driving is performed is decreased according to the progress of the deterioration state, it becomes easy to melt an electrode which is provided in a discharge lamp and which becomes difficult to melt with the progress of a deterioration state of the electrode. As a result, deformation of the electrode of the discharge lamp can be suppressed.

BRIEF DESCRIPTION OF THE DRAWINGS

Non-limiting and non-exhaustive embodiments of the present disclosure will be described with reference to the accompanying drawings, wherein like numbers reference like elements.

FIGS. 5A to 5D are explanatory views illustrating the relationship between the polarity of a driving current supplied to a discharge lamp and the temperature of an electrode.

FIGS. 9A to 9F are tables illustrating examples of a table of driving conditions.

FIG. 10A is a table illustrating an example of a table of driving conditions.

FIGS. 10B and 10C are timing charts illustrating examples of a waveform of the driving current.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

1. Optical System of Projector

Figure 1:
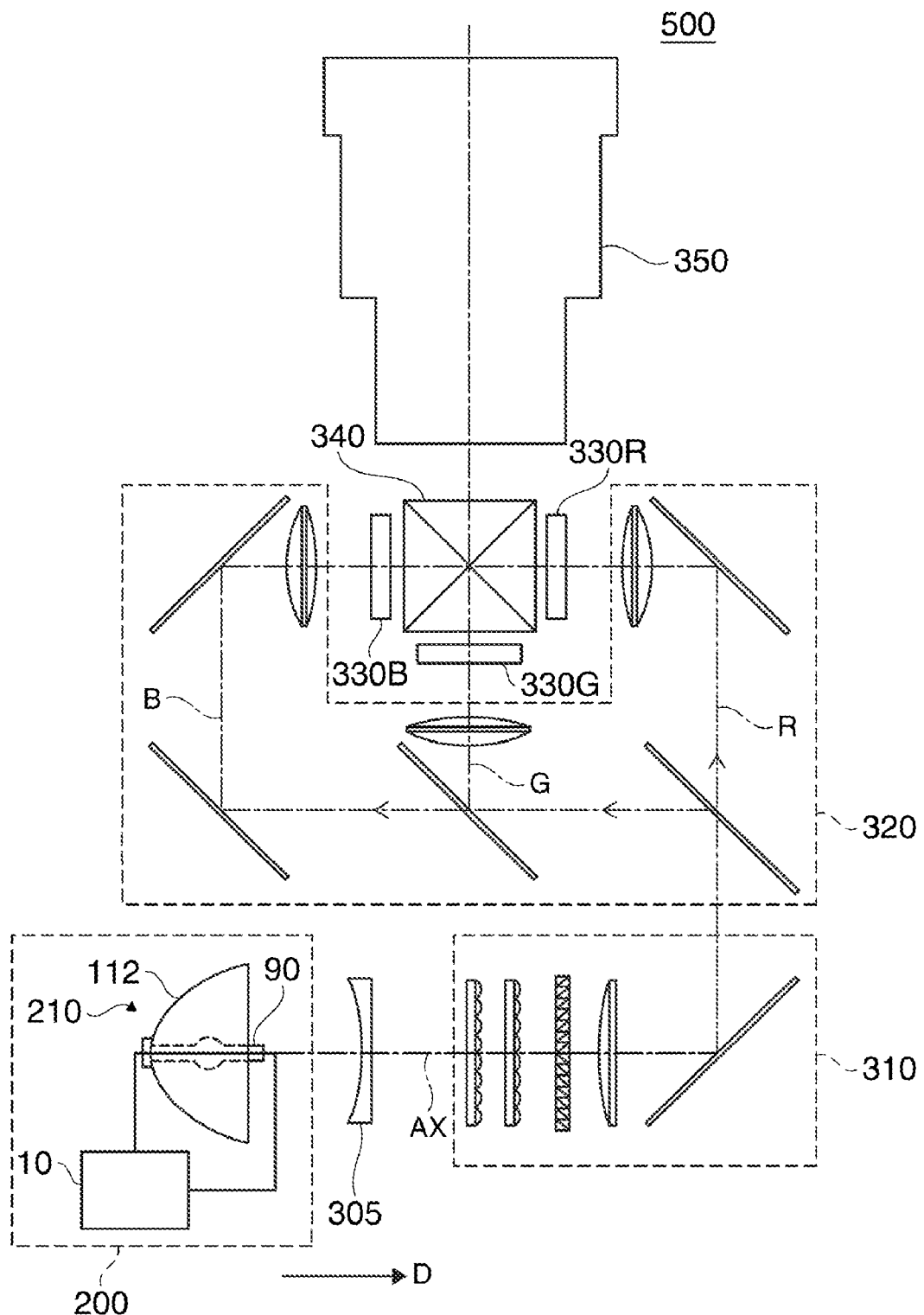
FIG. 1 is an explanatory view illustrating the configuration of a projector as an embodiment of the disclosure.

FIG. 1 is an explanatory view showing the configuration of a projector 500 as an embodiment of the disclosure. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 has a light source unit 210 and a discharge lamp lighting device 10. The light source unit 210 has a main reflecting mirror 112, an auxiliary reflecting mirror 50 (FIG. 2), and a discharge lamp 90. The discharge lamp lighting device 10 supplies electric power to the discharge lamp 90 so that the discharge lamp 90 lights. The main reflecting mirror 112 reflects the light emitted from the discharge lamp 90 toward the irradiation direction D. The irradiation direction D is parallel to the optical axis AX. The light from the light source unit 210 passes through the collimating lens 305 and is then incident on the illumination optical system 310. The collimating lens 305 collimates the light from the light source unit 210.

The illumination optical system 310 equalizes the illuminance of the light from the light source device 200 in the liquid crystal light valves 330R, 330G, and 330B. In addition, the illumination optical system 310 aligns the polarization direction of the light from the light source device 200 in one direction. The reason is in order to use the light from the light source device 200 effectively in the liquid crystal light valves 330R, 330G, and 330B. The light whose illuminance distribution and polarization direction have been adjusted is incident on the color separation optical system 320. The color separation optical system 320 separates the incident light into three color light components of red (R), green (G), and blue (B). The three color light components are modulated by the liquid crystal light valves 330R, 330G, and 330B corresponding to the colors, respectively. The liquid crystal light valves 330R, 330G, and 330B include liquid crystal panels 560R, 560G, and 560B and polarizers disposed at the light incidence and emission sides of the liquid crystal panels 560R, 560G, and 560B, respectively. The three modulated color light components are mixed by the cross dichroic prism 340. The mixed light is incident on the projection optical system 350. The projection optical system 350 projects the incident light onto a screen (not shown). As a result, an image is displayed on the screen.

In addition, various known configurations may be adopted as the configurations of the collimating lens 305, the illumination optical system 310, the color separation optical system 320, the cross dichroic prism 340, and the projection optical system 350.

Figure 2:
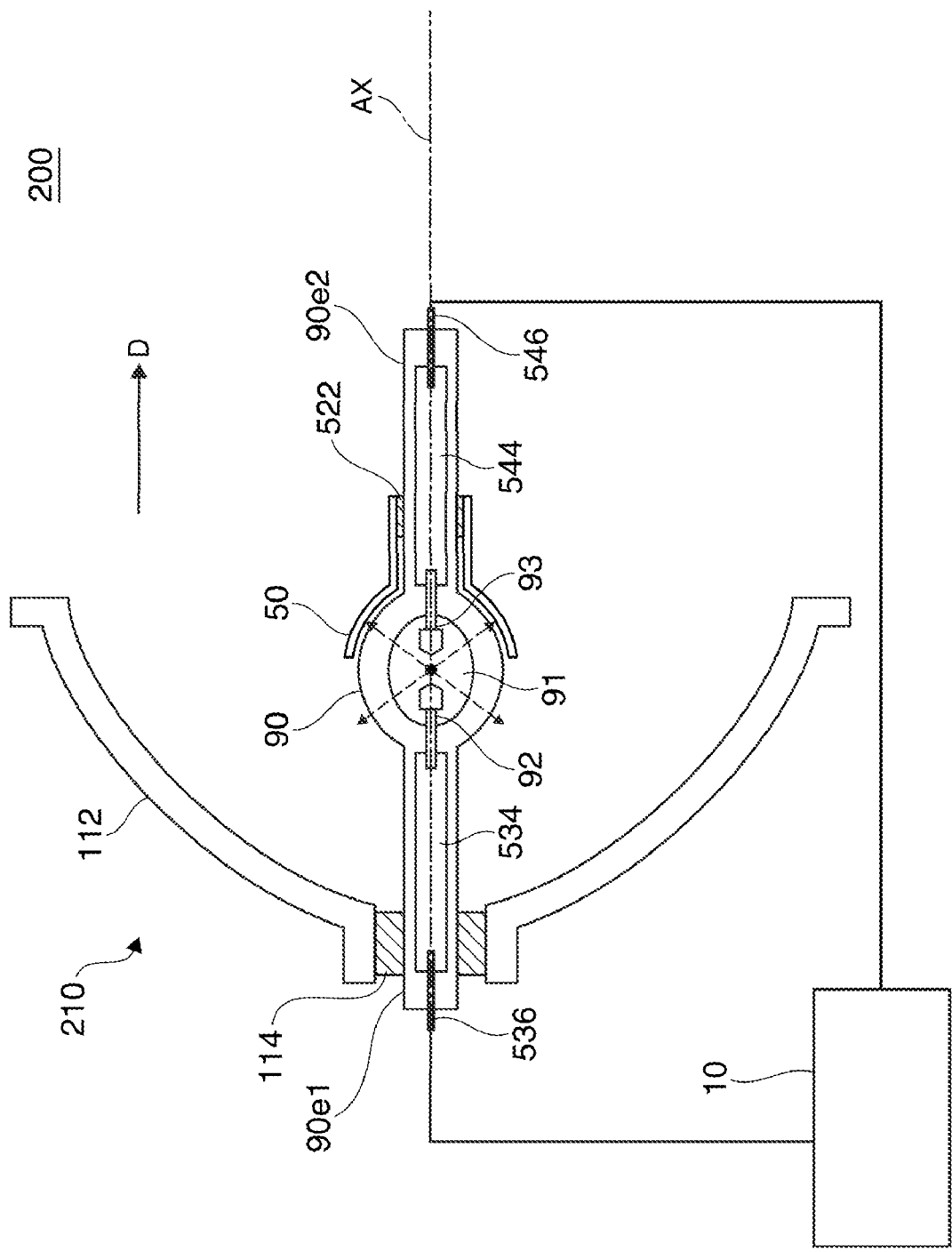
FIG. 2 is an explanatory view illustrating the configuration of a light source device.

FIG. 2 is an explanatory view showing the configuration of the light source device 200. The light source device 200 has the light source unit 210 and the discharge lamp lighting device 10. In FIG. 2, a sectional view of the light source unit 210 is shown. The light source unit 210 has the main reflecting mirror 112, the discharge lamp 90, and the auxiliary reflecting mirror 50.

The discharge lamp 90 has a rod shape which extends from a first end 90e1 to a second end 90e2 along the irradiation direction D. A material of the discharge lamp 90 is a translucent material, such as quartz glass. A middle portion of the discharge lamp 90 expands in the spherical shape, and a discharge space 91 is formed therein. Rare gas and gas, which is a discharge medium containing a metal halogen compound and the like, are injected into the discharge space 91.

Moreover, in the discharge space 91, two electrodes 92 and 93 protrude from the discharge lamp 90. The first electrode 92 is disposed at the first end 90e1 side of the discharge space 91, and the second electrode 93 is disposed at the second end 90e2 side of the discharge space 91. Each of the electrodes 92 and 93 has a rod shape extending along the optical axis AX. In the discharge space 91, tip portions (also called 'discharge ends') of the electrodes 92 and 93 face each other with a predetermined distance therebetween. In addition, the material of each of the electrodes 92 and 93 is metal, such as tungsten.

A first terminal 536 is provided at the first end 90e1 of the discharge lamp 90. The first terminal 536 and the first electrode 92 are electrically connected to each other by a conductive member 534 passing through the inside of the discharge lamp 90. Similarly, the second terminal 546 is provided at the second end 90e2 of the discharge lamp 90. The second terminal 546 and the second electrode 93 are electrically connected to each other by a conductive member 544 passing through the inside of the discharge lamp 90. The material of each of the terminals 536 and 546 is metal, such as tungsten. Moreover, for example, a molybdenum foil is used for the conductive members 534 and 544.

The terminals 536 and 546 are connected to the discharge lamp lighting device 10. The discharge lamp lighting device 10 supplies an alternate current to the terminals 536 and 546. As a result, arc discharge occurs between the two electrodes 92 and 93. The light (discharge light) generated by the arc discharge is emitted in all directions from the discharge position, as indicated by dotted arrows.

The main reflecting mirror 112 is fixed to the first end 90e1 of the discharge lamp 90 by a fixing member 114. The reflecting surface (surface facing the discharge lamp 90) of the main reflecting mirror 112 has a spheroidal shape. The main reflecting mirror 112 reflects the discharge light toward the irradiation direction D. In addition, the shape of the reflecting surface of the main reflecting mirror 112 is not limited to the spheroidal shape, and various shapes allowing the discharge light to be reflected toward the irradiation direction D may also be adopted. For example, the shape of a paraboloid of revolution may be adopted. In this case, the main reflecting mirror 112 can convert the discharge light into light which is almost parallel to the optical axis AX. Accordingly, the collimating lens 305 may not be provided.

The auxiliary reflecting mirror 50 is fixed to the second end 90e2 side of the discharge lamp 90 by a fixing member 522. The reflecting surface (surface facing the discharge lamp 90) of the auxiliary reflecting mirror 50 has a spherical shape surrounding the second end 90e2 side of the discharge space 91. The auxiliary reflecting mirror 50 reflects the discharge light toward the main reflecting mirror 112. Thus, the use efficiency of the light emitted from the discharge space 91 can be improved.

In addition, as the material of the fixing members 114 and 522, an arbitrary heat-resistant material (for example, an inorganic adhesive) which can stand the heat generation of the discharge lamp 90 may be adopted. In addition, the method of fixing the arrangement of the main reflecting mirror 112, the auxiliary reflecting mirror 50, and the discharge lamp 90 is not limited to the method of fixing the main reflecting mirror 112 and the auxiliary reflecting mirror 50 to the discharge lamp 90, and an arbitrary method may be adopted. For example, the discharge lamp 90 and the main reflecting mirror 112 may be fixed independently in a housing (not shown) of a projector. The same is true for the auxiliary reflecting mirror 50.

Figure 3:
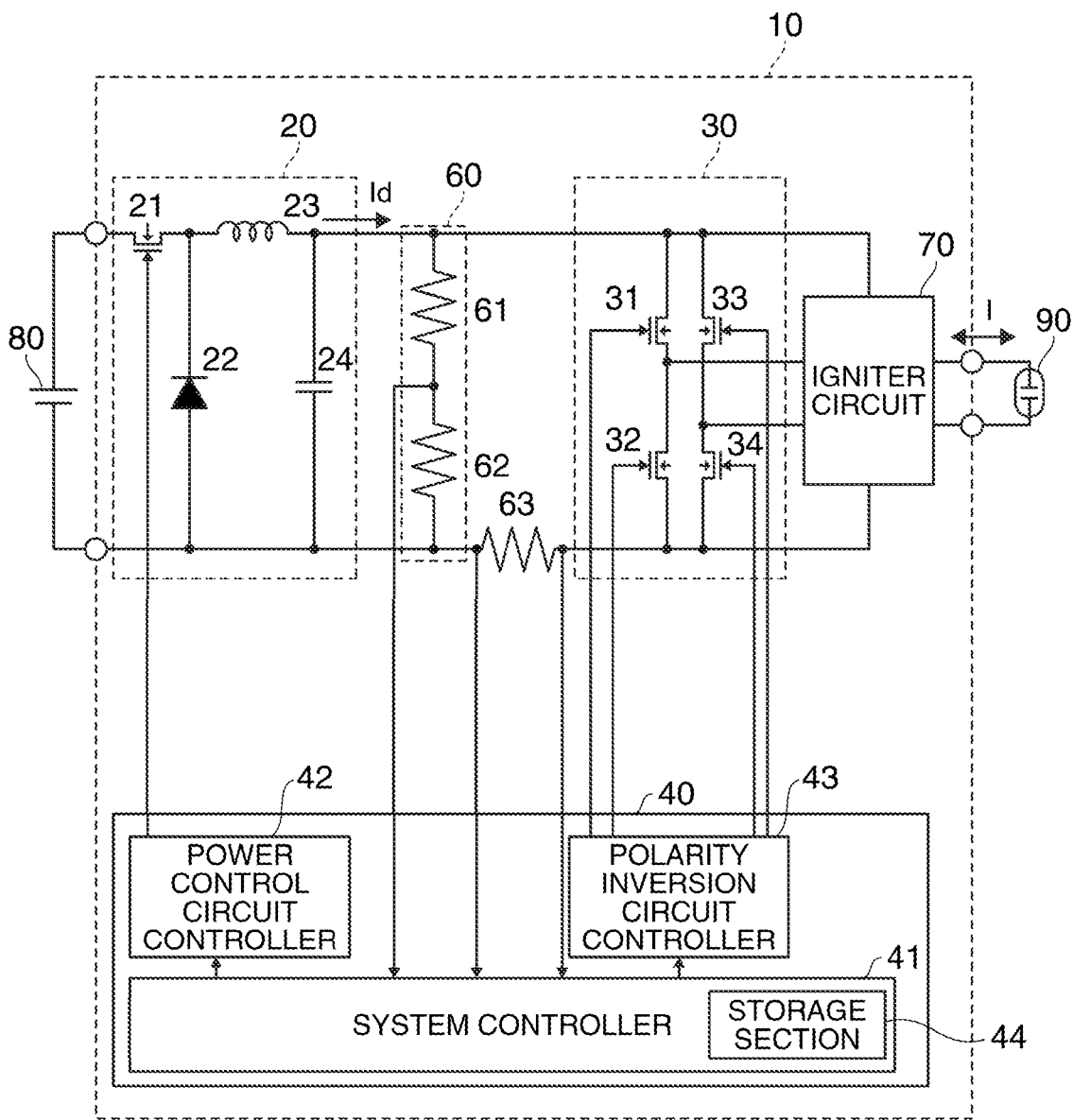
FIG. 3 illustrates an example of a circuit diagram of a discharge lamp lighting device according to the present embodiment.

2. Discharge Lamp Lighting Device According to First Embodiment (1) Configuration of Discharge Lamp Lighting Device FIG. 3 shows an example of the circuit diagram of the discharge lamp lighting device according to the present embodiment.

The discharge lamp lighting device 10 includes a power control circuit 20. The power control circuit 20 generates driving electric power supplied to the discharge lamp 90. In the present embodiment, the power control circuit 20 is formed as a down chopper circuit to which power from a DC power supply 80 is input and from which a direct current Id is output after dropping the input voltage.

The power control circuit 20 may be configured to include a switching element 21, a diode 22, a coil 23, and a condenser 24. The switching element 21 may be formed by a transistor, for example. In the present embodiment, one end of the switching element 21 is connected to a positive voltage side of the DC power supply 80, and the other end is connected to a cathode terminal of the diode 22 and one end of the coil 23. In addition, one end of the condenser 24 is connected to the other end of the coil 23, and the other end of the condenser 24 is connected to an anode terminal of the diode 22 and a negative voltage side of the DC power supply 80. A current control signal from a control unit 40 is input to a control terminal of the switching element 21 so that ON/OFF of the switching element 21 is controlled. For example, a PWM (Pulse Width Modulation) control signal may be used as the current control signal.

Here, when the switching element 21 is turned ON, a current flows through the coil 23 so that the energy is stored in the coil 23. Then, when the switching element 21 is turned OFF, the energy stored in the coil 23 is discharged in a path passing through the condenser 24 and the diode 22. As a result, the direct current Id corresponding to the rate of time for which the switching element 21 is in the ON state is generated.

The discharge lamp lighting device 10 includes a polarity inversion circuit 30. The direct current Id output from the power control circuit 20 is input to the polarity inversion circuit 30. Then, the polarity inversion circuit 30 inverts the polarity of the direct current Id at a predetermined timing to thereby generate and output a driving current I that is a direct current, which continues for a controlled period, or that is an alternating current with an arbitrary frequency. In the present embodiment, the polarity inversion circuit 30 is formed by an inverter bridge circuit (full bridge circuit).

For example, the polarity inversion circuit 30 is configured to include first to fourth switching elements 31 to 34, such as transistors. That is, the polarity inversion circuit 30 is formed by connecting the first and second switching elements 31 and 32, which are connected in series, in parallel to the third and fourth switching elements 33 and 34 connected in series. A polarity inversion control signal from the control unit 40 is input to control terminals of the first to fourth switching elements 31 to 34 so that ON/OFF of the first to fourth switching elements 31 to 34 is controlled.

The polarity inversion circuit 30 alternately inverts the polarity of the direct current Id output from the power control circuit 20 by alternately repeating ON/OFF of the first and fourth switching elements 31 and 34 and the second and third switching elements 32 and 33 and generates and outputs the driving current I that is a direct current, which continues for a controlled period, or that is an alternating current, which has an arbitrary frequency, from a common connection point of the first and second switching elements 31 and 32 and a common connection point of the third and fourth switching elements 33 and 34.

That is, the polarity inversion circuit 30 performs control such that the second and third switching elements 32 and 33 are turned OFF when the first and fourth switching elements 31 and 34 are turned ON and the second and third switching elements 32 and 33 are turned ON when the first and fourth switching elements 31 and 34 are turned OFF. Accordingly, when the first and fourth switching elements 31 and 34 are turned ON, the driving current I which flows from one end of the condenser 24 through the first switching element 31, the discharge lamp 90, and the fourth switching element 34 in this order is generated. In addition, when the second and third switching elements 32 and 33 are turned ON, the driving current I which flows from one end of the condenser 24 through the third switching element 33, the discharge lamp 90, and the second switching element 32 in this order is generated.

In the present embodiment, a combination of the power control circuit 20 and the polarity inversion circuit 30 corresponds to a discharge lamp driving section.

The discharge lamp lighting device 10 includes the control unit 40. The control unit 40 controls a holding time of the driving current I for which the same polarity continues and a current value, a frequency, and the like of the driving current I by controlling the power control circuit 20 and the polarity inversion circuit 30. The control unit 40 performs polarity inversion control for the polarity inversion circuit 30 at the polarity inversion timing of the driving current I in order to control a holding time of the driving current I for which the same polarity continues and a frequency and the like of the driving current I. In addition, the control unit 40 performs current control for the power control circuit 20 in order to control the current value of the output direct current Id.

The configuration of the control unit 40 is not particularly limited. In the present embodiment, the control unit 40 is configured to include a system controller 41, a power control circuit controller 42, and a polarity inversion circuit controller 43. In addition, a part or the entirety of the control unit 40 may be formed by a semiconductor integrated circuit.

The system controller 41 controls the power control circuit 20 and the polarity inversion circuit 30 by controlling the power control circuit controller 42 and the polarity inversion circuit controller 43. The system controller 41 may control the power control circuit controller 42 and the polarity inversion circuit controller 43 on the basis of the driving current I and a driving voltage Vla detected by a state detecting section provided in the discharge lamp lighting device 10, which will be described later.

In the present embodiment, the system controller 41 is configured to include a storage section 44. In addition, the storage section 44 may be provided separately from the system controller 41.

The system controller 41 may control the power control circuit 20 and the polarity inversion circuit 30 on the basis of the information stored in the storage section 44. For example, the information regarding driving parameters, such as a holding time of the driving current I for which the same polarity continues, a current value, a frequency, a waveform, and a modulation pattern of the driving current I, may be stored in the storage section 44. In addition, a table of driving conditions corresponding to the driving voltage Vla may be stored.

The power control circuit controller 42 controls the power control circuit 20 by outputting a current control signal to the power control circuit 20 on the basis of the control signal from the system controller 41.

The polarity inversion circuit controller 43 controls the polarity inversion circuit 30 by outputting a polarity inversion control signal to the polarity inversion circuit 30 on the basis of the control signal from the system controller 41.

In addition, the control unit 40 may receive a lighting command, which instructs the lighting of the discharge lamp 90, and a lights-out command, which instructs the putting out of the discharge lamp 90.

Figure 4:
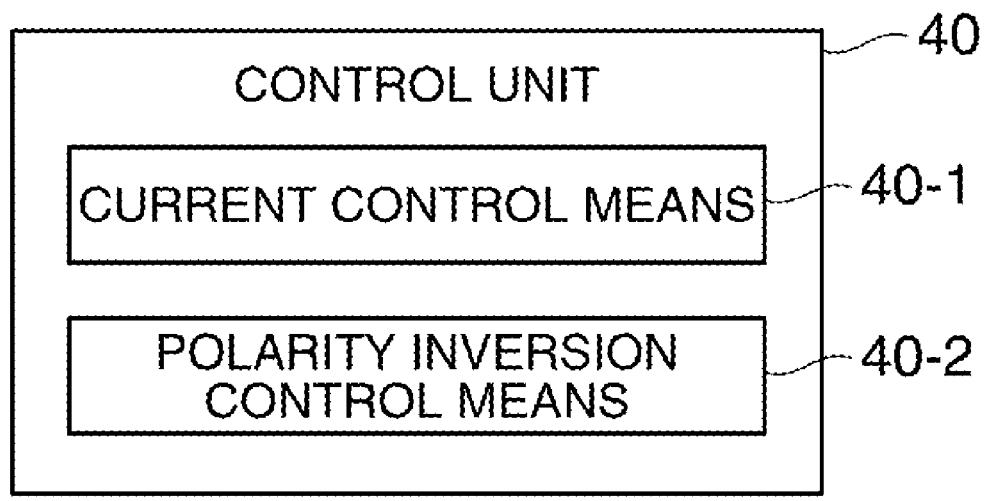
FIG. 4 is a view for explaining the configuration of a control unit in the present embodiment.

In addition, the control unit 40 may be realized by a dedicated circuit so that various kinds of control of the above-described processing or processing to be described later are performed. For example, the control unit 40 may be made to function as a computer by executing a control program stored in the storage section 44 by means of a CPU (Central Processing Unit), such that various kinds of control of the processing are performed. That is, as shown in FIG. 4, the control unit 40 may be made to function as a current control unit 40-1, which controls the power control circuit 20, and a polarity inversion control unit 40-2, which controls the polarity inversion circuit 30, by a control program.

The discharge lamp lighting device 10 may include the state detecting section. The state detecting section may include a voltage detecting section 60, which detects the driving voltage Vla of the discharge lamp 90 and outputs the driving voltage information, or a current detecting section which detects the driving current I and outputs the driving current information, for example. In the present embodiment, the voltage detecting section 60 is configured to include first and second resistors 61 and 62.

The voltage detecting section 60 corresponds to a state detecting section in the disclosure. That is, the driving voltage Vla is detected as a value indicating the degree of a deterioration state of an electrode.

In the present embodiment, the voltage detecting section detects the driving voltage Vla using a voltage divided by the first and second resistors 61 and 62, which are connected in series to each other and which are connected in parallel to the discharge lamp 90. Moreover, in the present embodiment, the current detecting section detects the driving current I using a voltage generated in a third resistor 63 connected in series to the discharge lamp 90.

The discharge lamp lighting device 10 may include an igniter circuit 70. The igniter circuit 70 operates only at the start of lighting the discharge lamp 90 and applies a high voltage (voltage which is higher than the voltage at the time of normal lighting of the discharge lamp 90), which is required to form a discharge path by dielectric breakdown between electrodes of the discharge lamp 90 at the start of lighting the discharge lamp 90, between the electrodes of the discharge lamp 90. In the present embodiment, the igniter circuit 70 is connected in parallel to the discharge lamp 90.

FIGS. 5A to 5D are explanatory views showing the relationship between the polarity of a driving current supplied to the discharge lamp 90 and the temperature of an electrode. FIGS. 5A and 5B show the operation state of the two electrodes 92 and 93. In FIGS. 5A and 5B, tip portions of the two electrodes 92 and 93 are shown. Projections 552p and 562p are provided on the tips of the electrodes 92 and 93, respectively. Discharge occurs between the projections 552p and 562p. In the present embodiment, the movement of the discharge position (arc position) in each of the electrodes 92 and 93 can be suppressed compared with the case where there is no projection. However, such projections may not be provided.

FIG. 5A shows a first polarity state P1 where the first electrode 92 operates as an anode and the second electrode 93 operates as a cathode. In the first polarity state P1, an electron moves from the second electrode 93 (cathode) to the first electrode 92 (anode) by discharge. An electron is emitted from the cathode (second electrode 93). The electron emitted from the cathode (second electrode 93) collides with the tip of the anode (first electrode 92). Heat is generated by the collision, and the temperature of the tip (projection 552p) of the anode (first electrode 92) rises.

FIG. 5B shows a second polarity state P2 where the first electrode 92 operates as a cathode and the second electrode 93 operates as an anode. In the second polarity state P2, an electron moves from the first electrode 92 to the second electrode 93 contrary to the first polarity state P1. As a result, the temperature of the tip (projection 562p) of the second electrode 93 rises.

Thus, the temperature of the anode is likely to rise compared with the cathode. Here, keeping a state where the temperature of one electrode is higher than that of the other electrode may cause various problems. For example, when the tip of a high-temperature electrode melts excessively, unintended electrode deformation may occur. As a result, the arc length may deviate from the appropriate value. In addition, when the tip of a low-temperature electrode melts insufficiently, fine uneven parts generated on the tip may remain without melting away. As a result, so-called arc jump may occur (arc position is not stabilized and moves).

As a technique of suppressing such a problem, AC driving for changing the polarity of each electrode repeatedly may be used. FIG. 5C is a timing chart showing an example of the driving current I supplied to the discharge lamp 90 (FIG. 2). The horizontal axis indicates a time T, and the vertical axis indicates the current value of the driving current I. The driving current I indicates a current flowing through the discharge lamp 90. The positive value indicates the first polarity state P1, and the negative value indicates the second polarity state P2. In the example shown in FIG. 5C, a rectangular wave alternating current is used. In addition, the first and second polarity states P1 and P2 are repeated alternately. Here, a first polarity section Tp indicates a time for which the first polarity state P1 continues, and a second polarity section Tn indicates a time for which the second polarity state P2 continues. In addition, the average current value of the first polarity section Tp is Im1, and the average current value of the second polarity section Tn is −Im2. In addition, a frequency of the driving current I suitable for the driving of the discharge lamp 90 may be experimentally determined according to the characteristic of the discharge lamp 90 (for example, the value in a range of 30 Hz to 1 kHz is adopted). Similarly, the other values Im1, −Im2, Tp, and Tn may also be determined experimentally.

FIG. 5D is a timing chart showing a change in the temperature of the first electrode 92. The horizontal axis indicates a time T, and the vertical axis indicates a temperature H. The temperature H of the first electrode 92 rises in the first polarity state P1 and drops in the second polarity state P2. In addition, since the first and second polarity states P1 and P2 are repeated, the temperature H changes periodically between the minimum value Hmin and the maximum value Hmax. In addition, although not shown, the temperature of the second electrode 93 changes in an opposite phase to the temperature H of the first electrode 92. That is, the temperature of the second electrode 93 drops in the first polarity state P1 and rises in the second polarity state P2.

Since the tip of the first electrode 92 (projection 552p) melts in the first polarity state P1, the tip of the first electrode 92 (projection 552p) becomes smooth. As a result, the movement of the discharge position in the first electrode 92 can be suppressed. In addition, since the temperature of the tip of the second electrode 93 (projection 562p) drops, the excessive melting of the second electrode 93 (projection 562p) is suppressed. As a result, unintended electrode deformation can be suppressed. In the second polarity state P2, the states of the first and second electrodes 92 and 93 are opposite. Accordingly, a problem in each of the two electrodes 92 and 93 can be suppressed by repeating the two states P1 and P2.

Here, if the waveform of the current I is symmetrical, that is, if the waveform of the current I satisfies the conditions of "|Im1|=|−Im2|, Tp=Tn", the conditions of supplied electric power between the two electrodes 92 and 93 are the same. Accordingly, it is presumed that the temperature difference between the two electrodes 92 and 93 decreases.

In addition, if an electrode is too heated over a wide range (if arc spot (hot spot on the electrode surface generated by arc discharge) becomes large), the shape of the electrode deforms by excessive fusion. On the contrary, if the electrode is too cold (arc spot is small), the tip of the electrode cannot melt sufficiently. As a result, the tip cannot be returned smoothly. That is, the tip of the electrode easily deforms. Accordingly, if a uniform energy supply state continues for the electrode, the tip (projections 552p and 562p) of the electrode easily deforms to the unintended shape.

(2) Example Regarding Control of Discharge Lamp Lighting Device

Next, a specific example regarding the control of the discharge lamp lighting device 10 according to the first embodiment will be described.

The control unit 40 of the discharge lamp lighting device 10 according to the first embodiment performs first DC driving processing D1 (first DC driving) and first AC driving processing A1 (first AC driving) alternately in a first section, and performs second DC driving processing D2 (second DC driving) and second AC driving processing A2 (second AC driving) alternately in a second section different from the first section.

Figure 6A:
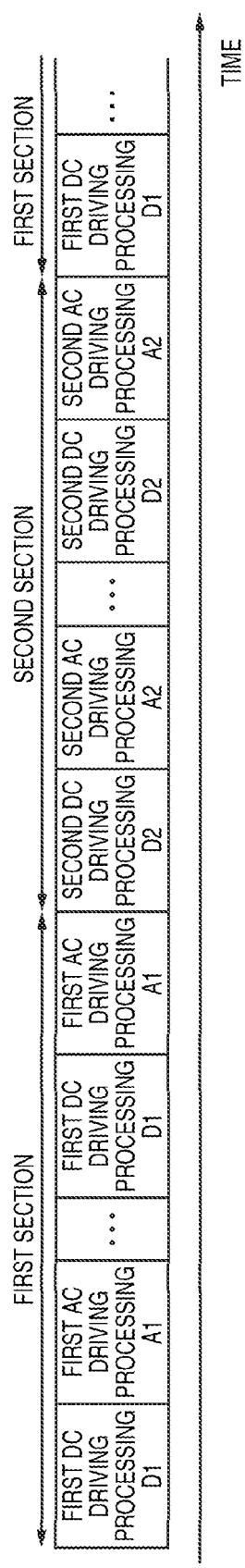
FIGS. 6A and 6B are views for explaining first and second sections.
Figure 6B:
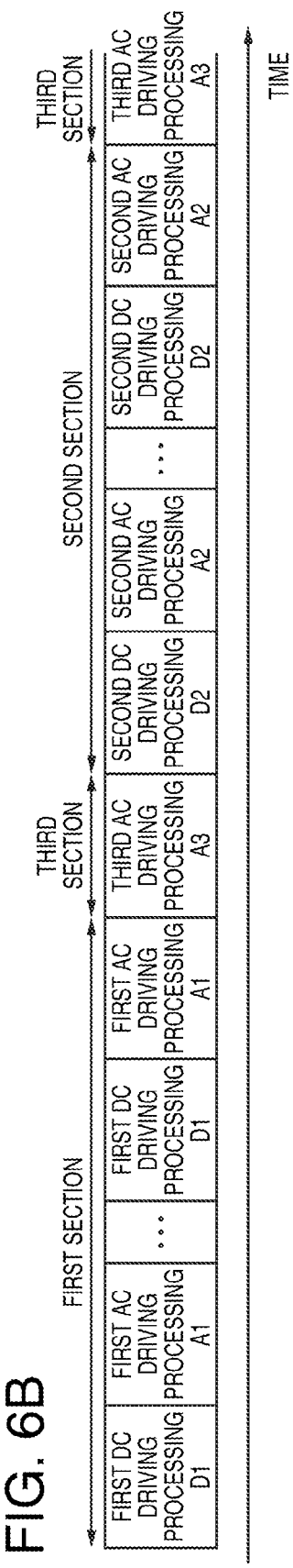

FIGS. 6A and 6B are views for explaining the first and second sections.

In the example shown in FIG. 6A, the control unit 40 controls a discharge lamp driving section such that the first section, in which the first DC driving processing D1 and the first AC driving processing A1 are alternately performed, and the second section, in which the second DC driving processing D2 and the second AC driving processing A2 are alternately performed, appear alternately.

Moreover, in the example shown in FIG. 6A, in the first section, the first DC driving processing D1 and the first AC driving processing A1 are alternately performed such that it starts in the first DC driving processing D1 and ends in the first AC driving processing A1. Moreover, in the second section, the second DC driving processing D2 and the second AC driving processing A2 are alternately performed such that it starts in the second DC driving processing D2 and ends in the second AC driving processing A2.

In addition, the control unit 40 may control the discharge lamp driving section such that a third section different from the first and second sections appears. For example, in the example shown in FIG. 6B, the control unit 40 controls the discharge lamp driving section such that a third section, in which third AC driving processing A3 is performed, appears between the first and second sections.

The control unit 40 performs control of supplying a first direct current, which starts from the first polarity and has a first polarity component, as the driving current I in the first DC driving processing D1 and performs control of supplying a first alternating current, which repeats a first polarity component and a second polarity component at a first frequency, as the driving current I in the first AC driving processing A1.

The control unit 40 performs control of supplying a second direct current, which starts from the second polarity and has a second polarity component, as the driving current I in the second DC driving processing D2 and performs control of supplying a second alternating current, which repeats a first polarity component and a second polarity component at a second frequency, as the driving current I in the second AC driving processing A2.

The control unit 40 may perform the first AC driving processing A1 and the second AC driving processing A2 using the first and second frequencies of different values. In addition, in the following example, the case will be described in which the first and second frequencies are the same.

Moreover, in the example shown in FIG. 6B, the control unit 40 may perform control of supplying a third alternating current, which repeats a first polarity component and a second polarity component at a third frequency different from the first and second frequencies, as the driving current I in the third AC driving processing A3.

Figure 7A:
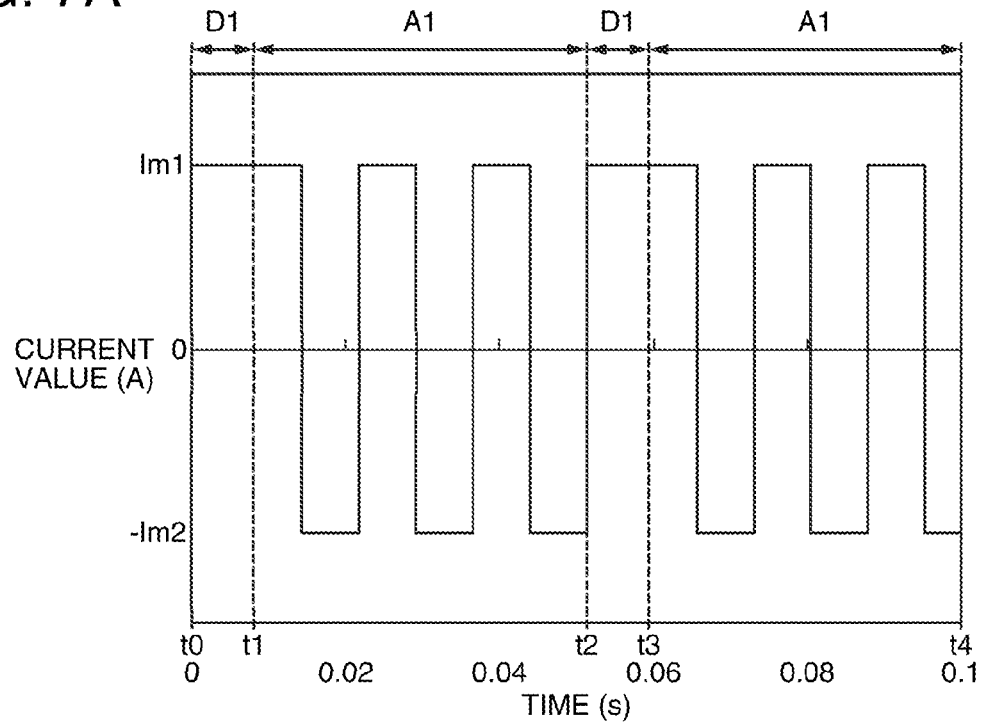
FIG. 7A is a timing chart illustrating an example of a waveform of a driving current in the first section.
Figure 7B:
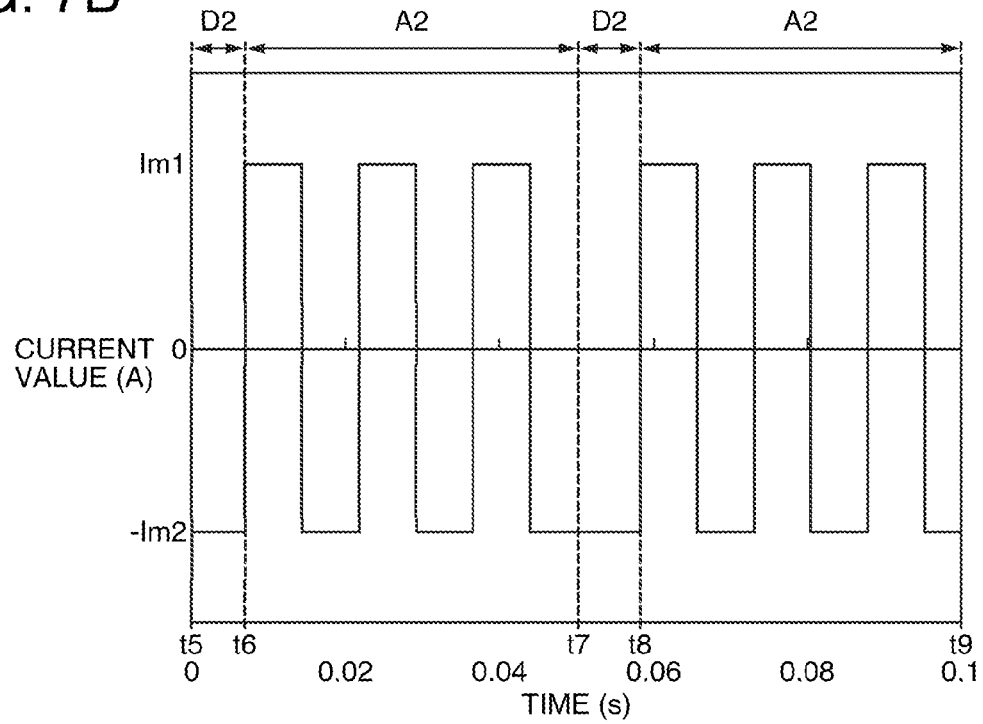
FIG. 7B is a timing chart illustrating an example of a waveform of the driving current in the second section.

FIG. 7A is a timing chart showing an example of a waveform of the driving current I in the first section, and FIG. 7B is a timing chart showing an example of a waveform of the driving current I in the second section. In FIGS. 7A and 7B, the horizontal axis indicates a time and the vertical axis indicates the current value of the driving current I. In FIGS. 7A and 7B, the driving current I with the first polarity is set to have a positive value, and the driving current I with the second polarity is set to have a negative value.

In the example shown in FIG. 7A, the control unit 40 performs the first DC driving processing D1 in a period from time t0 to time t1, the first AC driving processing A1 in a period from time t1 to time t2, the first DC driving processing D1 in a period from t2 to time t3, and the first AC driving processing A1 in a period from time t3 to time t4.

In the example shown in FIG. 7A, the control unit 40 performs control of supplying the driving current I, which holds the same polarity (first polarity) for a period longer than a ½ period of the driving current I in the first AC driving processing A1, in the first DC driving processing D1.

In addition, in the example shown in FIG. 7A, the control unit 40 performs control of supplying the driving current I, which is a rectangular wave alternating current starting from a phase of the same polarity (first polarity) as in the previous first DC driving processing D1, in the first AC driving processing A1.

In the example shown in FIG. 7B, the control unit 40 performs the second DC driving processing D2 in a period from time t5 to time t6, the second AC driving processing A2 in a period from time t6 to time t7, the second DC driving processing D2 in a period from t7 to time t8, and the second AC driving processing A2 in a period from time t8 to time t9.

In the example shown in FIG. 7B, the control unit 40 performs control of supplying the driving current I, which holds the same polarity (second polarity) for a period longer than a ½ period of the driving current I in the second AC driving processing A2, in the second DC driving processing D2.

Moreover, in the example shown in FIG. 7B, similar to the first AC driving processing A1, the control unit 40 performs control of supplying the driving current I, which is a rectangular wave alternating current starting from a phase of the same polarity (first polarity) as in the first DC driving processing D1, in the second AC driving processing A2.

Since a current flows with the same polarity in a period for which the driving current I is a direct current, the arc spot becomes large. Accordingly, an electrode tip portion including an unnecessary projection and the like can be melted smoothly. Since a current which repeats the first and second polarities alternately flows in a period for which the driving current I is an alternating current, the arc spot becomes small. Accordingly, the growth of a projection of an electrode tip portion needed as an arc origin can be promoted.

Accordingly, by alternately repeating a period for which the driving current I is a direct current and a period for which the driving current I is an alternating current by appropriately setting the driving conditions (for example, a frequency in a period for which the driving current I is an alternating current, the length (DC time) of a period for which the driving current I is a direct current, and the length (AC time) of a period for which the driving current I is an alternating current), the electrode shape is satisfactorily maintained. As a result, the discharge lamp 90 can be stably lighted.

However, even if a discharge lamp is driven under the same driving conditions, the growth degree or the melting degree of a projection of an electrode tip portion which becomes an arc origin changes with a deterioration state of the electrode. For example, when the melting degree of an electrode tip portion is not sufficient, a projection of the electrode tip portion may deform. Moreover, when the melting degree of the electrode tip portion is excessive, the electrode material may evaporate excessively to cause blackening or needle-like crystals.

Accordingly, in the discharge lamp lighting device 10 according to the first embodiment, the control unit 40 increases the length of at least one of the period, for which the first DC driving processing D1 is performed, and the period, for which the second DC driving processing D2 is performed, according to the progress of the deterioration state. In the following example, an example will be described in which both the length of the period for which the first DC driving processing D1 is performed and the length of the period for which the second DC driving processing D2 is performed.

Figure 8:
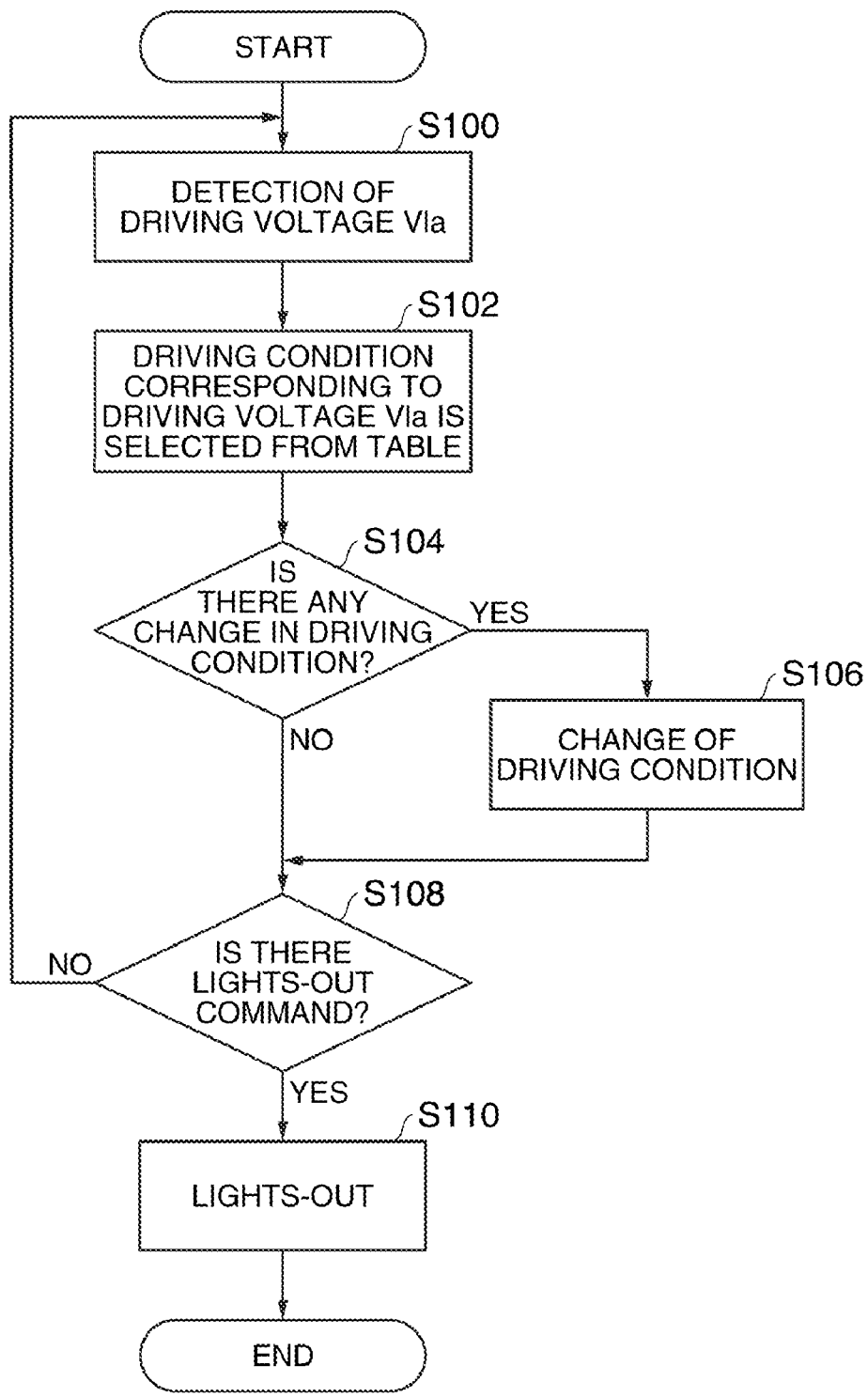
FIG. 8 is a flow chart illustrating an example regarding the control of a discharge lamp lighting device in a first embodiment.

FIG. 8 is a flow chart showing an example regarding the control of the discharge lamp lighting device 10 according to the first embodiment. The flow chart shown in FIG. 8 shows the control of the discharge lamp 90 after lighting stably until being put out.

First, the voltage detecting section 60 detects the driving voltage Vla (step S100). Then, the control unit 40 selects a driving condition, which corresponds to the driving voltage Vla detected in step S100, from the table stored in the storage section 44 (step S102).

FIGS. 9A to 9F are tables showing examples of a table of driving conditions. In these tables, the driving voltage Vla, a DC time, an AC time, and a frequency are included. The DC time is the length of a period, for which the first DC driving processing D1 is performed, in the first section and the length of a period, for which the second DC driving processing D2 is performed, in the second section. The AC time is the length of a period, for which the first AC driving processing A1 is performed, in the first section and the length of a period, for which the second AC driving processing A2 is performed, in the second section.

In the discharge lamp lighting device 10 according to the first embodiment, a driving condition is selected from the table shown in FIG. 9A. In the table shown in FIG. 9A, the DC time increases as the driving voltage Vla becomes high, and the AC time and the frequency are constant.

After selecting the driving condition in step S102 in FIG. 8, the control unit 40 determines whether or not it is necessary to change the driving condition (step S104). If the control unit 40 determines that it is necessary to change the driving condition (in the case of YES in step S104), the control unit 40 changes it to the driving condition selected in step S102 and drives the discharge lamp 90 (step S106). If the control unit 40 determines that it is not necessary to change the driving condition (in the case of NO in step S104), the control unit 40 keeps driving the discharge lamp 90 under the previous driving condition.

In the case of NO in step S104 and after step S106, the control unit 40 determines whether or not there is a lights-out command of the discharge lamp 90 (step S108). If it is determined that there is a lights-out command (in the case of YES in step S108), the control unit 40 ends the lighting of the discharge lamp 90 (puts out the discharge lamp 90). If it is determined that there is no lights-out command (in the case of NO in step S108), the control unit 40 repeats the control from step S100 to step S108 until there is a lights-out command.

As a deterioration state of the first and second electrodes 92 and 93 of the discharge lamp 90 progresses, the distance (distance between electrodes) between the first and second electrodes 92 and 93 increases. If the distance between electrodes increases, the driving voltage Vla rises. That is, the driving voltage Vla rises with the progress of the deterioration state.

Accordingly, in the discharge lamp lighting device 10 according to the first embodiment, the length of at least one of the period for which the first DC driving processing D1 is performed and the period for which the second DC driving processing D2 is performed is increased according to an increase in the driving voltage Vla (progress of the deterioration state). Therefore, since the electrode temperature becomes higher in a DC period, it becomes easy to melt the electrode which is provided in the discharge lamp 90 and which becomes difficult to melt with the progress of a deterioration state of the electrode. As a result, deformation of the electrode of the discharge lamp can be suppressed.

3. Discharge Lamp Lighting Device According to Second Embodiment

In a discharge lamp lighting device 10 according to a second embodiment, a control unit 40 decreases the length of at least one of the period, for which the first AC driving processing A1 is performed, and the period, for which the second AC driving processing A2 is performed, according to the progress of the deterioration state. In the following example, the case will be described in which both the length of the period for which the first AC driving processing A1 is performed and the length of the period for which the second AC driving processing A2 is performed are decreased. The circuit configuration and other controls of the discharge lamp lighting device 10 according to the second embodiment are the same as those of the discharge lamp lighting device 10 according to the first embodiment.

In the discharge lamp lighting device 10 according to the second embodiment, the control unit 40 selects a driving condition from the table shown in FIG. 9B in step S102 of the flow chart shown in FIG. 8. In the table shown in FIG. 9B, the AC time decreases as the driving voltage Vla increases, and the DC time and the frequency are constant.

In the discharge lamp lighting device 10 according to the second embodiment, the length of at least one of the period for which the first AC driving processing A1 is performed and the period for which the second AC driving processing A2 is performed is decreased according to an increase in the driving voltage Vla (progress of the deterioration state). Therefore, since the frequency of the DC period for which the electrode temperature rises is increased, it becomes easy to melt the electrode which is provided in the discharge lamp 90 and which becomes difficult to melt with the progress of a deterioration state of the electrode. As a result, deformation of the electrode of the discharge lamp can be suppressed.

4. Discharge Lamp Lighting Device According to Third Embodiment

In a discharge lamp lighting device 10 according to a third embodiment, according to the progress of the deterioration state, a control unit 40 increases the length of at least one of the period for which the first DC driving processing D1 is performed and the period for which the second DC driving processing D2 is performed and decreases the length of at least one of the period for which the first AC driving processing A1 is performed and the period for which the second AC driving processing A2 is performed. In the following example, the case will be described in which both the length of the period for which the first DC driving processing D1 is performed and the length of the period for which the second DC driving processing D2 is performed are increased and both the length of the period for which the first AC driving processing A1 is performed and the length of the period for which the second AC driving processing A2 is performed are decreased. The circuit configuration and other controls of the discharge lamp lighting device 10 according to the third embodiment are the same as those of the discharge lamp lighting device 10 according to the first embodiment.

In the discharge lamp lighting device 10 according to the third embodiment, the control unit 40 selects a driving condition from the table shown in FIG. 9C in step S102 of the flow chart shown in FIG. 8. In the table shown in FIG. 9C, the DC time increases and the AC time decreases as the driving voltage Vla increases, and the frequency is constant.

In the discharge lamp lighting device 10 according to the third embodiment, according to an increase in the driving voltage Vla (progress of the deterioration state), the length of at least one of the period for which the first DC driving processing D1 is performed and the period for which the second DC driving processing D2 is performed is increased and the length of at least one of the period for which the first AC driving processing A1 is performed and the period for which the second AC driving processing A2 is performed is decreased. Therefore, since the electrode temperature becomes higher in a DC period and the frequency of DC period for which the electrode temperature rises is increased, it becomes easy to melt the electrode which is provided in the discharge lamp 90 and which becomes difficult to melt with the progress of a deterioration state of the electrode. As a result, deformation of the electrode of the discharge lamp can be suppressed.

5. Discharge Lamp Lighting Device According to Fourth Embodiment

In a discharge lamp lighting device 10 according to a fourth embodiment, according to the progress of the deterioration state, a control unit 40 increases the length of at least one of the period for which the first DC driving processing D1 is performed and the period for which the second DC driving processing D2 is performed and increases at least one of a first frequency in the first AC driving processing A1 and a second frequency in the second AC driving processing A2. In the following example, the case will be described in which both the length of the period for which the first DC driving processing D1 is performed and the length of the period for which the second DC driving processing D2 is performed are increased and both the first and second frequencies are increased. The circuit configuration and other controls of the discharge lamp lighting device 10 according to the fourth embodiment are the same as those of the discharge lamp lighting device 10 according to the first embodiment.

In the discharge lamp lighting device 10 according to the fourth embodiment, the control unit 40 selects a driving condition from the table shown in FIG. 9D in step S102 of the flow chart shown in FIG. 8. In the table shown in FIG. 9D, the DC time increases and the frequency increases as the driving voltage Vla increases, and the AC time is constant.

When the deterioration state of the first and second electrodes 92 and 93 of the discharge lamp 90 is in progress, the shape of a projection of the electrode tip portion deforms. For this reason, it becomes difficult to stabilize the arc origin. The unstable arc origin causes flickering of the discharge lamp 90. Moreover, when the deterioration state is not in progress, it is thought that the shape of a projection of an electrode tip portion is maintained to some extent. Accordingly, it is preferable to make the base of the projection of the electrode tip portion grow largely so that the shape does not deform.

Therefore, the arc origin can be stabilized by supplying a high-frequency alternating current, by which the arc spot becomes relatively small with the progress of the deterioration state of the first and second electrodes 92 and 93 of the discharge lamp 90, as the driving current I. Moreover, when the deterioration state is not in progress, a projection with a strong base can be made to grow by supplying a low-frequency alternating current, by which the arc spot becomes relatively large, as the driving current I.

In the discharge lamp lighting device 10 according to the fourth embodiment, according to an increase in the driving voltage Vla (progress of the deterioration state), the length of at least one of the period for which the first DC driving processing D1 is performed and the period for which the second DC driving processing D2 is performed is increased and at least one of the first frequency in the first AC driving processing A1 and the second frequency in the second AC driving processing A2 is increased. Therefore, since the electrode temperature becomes higher in a DC period, it becomes easy to melt the electrode which is provided in the discharge lamp 90 and which becomes difficult to melt with the progress of a deterioration state of the electrode. In addition, a projection can grow stably when the deterioration state is not in progress, and the arc origin can be ensured early when the deterioration state is in progress.

6. Discharge Lamp Lighting Device According to Fifth Embodiment

In a discharge lamp lighting device 10 according to a fifth embodiment, according to the progress of the deterioration state, a control unit 40 decreases the length of at least one of the period for which the first AC driving processing A1 is performed and the period for which the second AC driving processing A2 is performed and increases at least one of a first frequency in the first AC driving processing A1 and a second frequency in the second AC driving processing A2. In the following example, the case will be described in which both the length of the period for which the first AC driving processing A1 is performed and the length of the period for which the second AC driving processing A2 is performed are decreased and both the first and second frequencies are increased. The circuit configuration and other controls of the discharge lamp lighting device 10 according to the fifth embodiment are the same as those of the discharge lamp lighting device 10 according to the first embodiment.

In the discharge lamp lighting device 10 according to the fifth embodiment, the control unit 40 selects a driving condition from the table shown in FIG. 9E in step S102 of the flow chart shown in FIG. 8. In the table shown in FIG. 9E, the AC time decreases and the frequency increases as the driving voltage Vla increases, and the DC time is constant.

In the discharge lamp lighting device 10 according to the fifth embodiment, according to an increase in the driving voltage Vla (progress of the deterioration state), the length of at least one of the period for which the first AC driving processing A1 is performed and the period for which the second AC driving processing A2 is performed is decreased and at least one of the first frequency in the first AC driving processing A1 and the second frequency in the second AC driving processing A2 is increased. Therefore, since the frequency of DC period for which the electrode temperature rises is increased, it becomes easy to melt the electrode which is provided in the discharge lamp 90 and which becomes difficult to melt with the progress of a deterioration state of the electrode. In addition, a projection can grow stably when the deterioration state is not in progress, and the arc origin can be ensured early when the deterioration state is in progress.

7. Discharge Lamp Lighting Device According to Sixth Embodiment

In a discharge lamp lighting device 10 according to a sixth embodiment, according to the progress of the deterioration state, a control unit 40 increases the length of at least one of the period for which the first DC driving processing D1 is performed and the period for which the second DC driving processing D2 is performed, decreases the length of at least one of the period for which the first AC driving processing A1 is performed and the period for which the second AC driving processing A2 is performed, and increases at least one of a first frequency in the first AC driving processing A1 and a second frequency in the second AC driving processing A2. In the following example, the case will be described in which both the length of the period for which the first DC driving processing D1 is performed and the length of the period for which the second DC driving processing D2 is performed are increased, both the length of the period for which the first AC driving processing A1 is performed and the length of the period for which the second AC driving processing A2 is performed are decreased, and both the first and second frequencies are increased. The circuit configuration and other controls of the discharge lamp lighting device 10 according to the sixth embodiment are the same as those of the discharge lamp lighting device 10 according to the first embodiment.

In the discharge lamp lighting device 10 according to the sixth embodiment, the control unit 40 selects a driving condition from the table shown in FIG. 9F in step S102 of the flow chart shown in FIG. 8. In the table shown in FIG. 9F, as the driving voltage Vla increases, the DC time increases, the AC time decreases, and the frequency increases.

In the discharge lamp lighting device 10 according to the sixth embodiment, according to an increase in the driving voltage Vla (progress of the deterioration state), the length of at least one of the period for which the first DC driving processing D1 is performed and the period for which the second DC driving processing D2 is performed is increased, the length of at least one of the period for which the first AC driving processing A1 is performed and the period for which the second AC driving processing A2 is performed is decreased, and at least one of the first frequency in the first AC driving processing A1 and the second frequency in the second AC driving processing A2 is increased. Therefore, since the electrode temperature becomes higher in a DC period and the frequency of DC period for which the electrode temperature rises is increased, it becomes easy to melt the electrode which is provided in the discharge lamp 90 and which becomes difficult to melt with the progress of a deterioration state of the electrode. In addition, a projection can grow stably when the deterioration state is not in progress, and the arc origin can be ensured early when the deterioration state is in progress.

8. Discharge Lamp Lighting Device According to Seventh Embodiment

In a discharge lamp lighting device 10 according to a seventh embodiment, when the deterioration state is smaller than a first reference value, the control unit 40 changes a first frequency from low frequency to high frequency during a period for which the first AC driving processing A1 is performed and changes a second frequency from low frequency to high frequency during a period for which the second AC driving processing A2 is performed. In addition, when the deterioration state is equal to or larger than a second reference value, the control unit 40 changes the first frequency from high frequency to low frequency during a period for which the first AC driving processing A1 is performed and changes the second frequency from high frequency to low frequency during a period for which the second AC driving processing A2 is performed. The circuit configuration and other controls of the discharge lamp lighting device 10 according to the seventh embodiment are the same as those of the discharge lamp lighting device 10 according to the first embodiment.

The first and second reference values are reference values of the value indicating the degree of a deterioration state. For example, the first and second reference values may be reference values of the driving voltage Vla. The second reference value may be a value equal to or larger than the first reference value. In addition, the first and second reference values may be the same values. In the following example, the case will be described in which the value indicating a deterioration state is set as the driving voltage Vla and the first and second reference values are equally set to 90V.

FIG. 10A is a table showing an example of a table of driving conditions, and FIGS. 10B and 10C are timing charts showing examples of a waveform of the driving current I. In FIG. 10A, a frequency modulation pattern is a modulation pattern of the first frequency during a period for which the first AC driving processing A1 is performed and a modulation pattern of a second frequency during a period for which the second AC driving processing A2 is performed. In FIGS. 10B and 10C, the horizontal axis indicates a time and the vertical axis indicates the current value of the driving current I. Moreover, FIGS. 10B and 10C show examples of a waveform in the first section.

In the discharge lamp lighting device 10 according to the seventh embodiment, the control unit 40 selects a driving condition from the table shown in FIG. 10A in step S102 of the flow chart shown in FIG. 8. In the table shown in FIG. 10A, a frequency modulation pattern in which the frequency changes from low frequency to high frequency is set when the driving voltage Vla is smaller than 90V (first reference value) and a frequency modulation pattern in which the frequency changes from high frequency to low frequency is set when the driving voltage Vla is equal to or larger than 90V (second reference value). In addition, the AC time decreases as the driving voltage Vla increases, and the DC time is constant.

FIG. 10B shows an example of a waveform in the first section when the driving voltage Vla is smaller than 90V (first reference value) in the table shown in FIG. 10A. In the example shown in FIG. 10B, during the period for which the first AC driving processing A1 is performed, the frequency of the driving current I is changed in order of 68 Hz, 136 Hz, and 204 Hz for every period.

FIG. 10C shows an example of a waveform in the first section when the driving voltage Vla is equal to or larger than 90V (second reference value) in the table shown in FIG. 10A. In the example shown in FIG. 10C, during the period for which the first AC driving processing A1 is performed, the frequency of the driving current I is changed in the order of 272 Hz, 204 Hz, and 102 Hz for every period.

When the deterioration state of the first and second electrodes 92 and 93 of the discharge lamp 90 is in progress, the shape of a projection of the electrode tip portion deforms. For this reason, it becomes difficult to stabilize the arc origin. The unstable arc origin causes flickering of the discharge lamp 90. Moreover, when the deterioration state is not in progress, it is thought that the shape of a projection of an electrode tip portion is maintained to some extent. Accordingly, it is preferable to make the base of the projection of the electrode tip portion grow largely so that the shape does not deform.

Therefore, when the deterioration state is not in progress, a projection with a large base is formed by supplying a low-frequency alternating current, by which an arc spot becomes relatively large, as the driving current I. Then, by gradually increasing the frequency, a projection with a strong base can grow with being slightly angulated. In addition, when the deterioration state of the first and second electrodes 92 and 93 of the discharge lamp 90 is in progress, a stable arc origin is ensured early by supplying a high-frequency alternating current, by which the arc spot becomes relatively small, as the driving current I. Then, the frequency is gradually decreased so that a solid projection can grow.

9. Modifications of Discharge Lamp Lighting Devices According to First to Seventh Embodiments In the first to seventh embodiments, when the deterioration state is equal to or smaller than a predetermined value, the DC time may be set to 0. For example, in the tables shown in FIGS. 9A to 9F, the DC time may be set to 0 second when the driving voltage Vla is smaller than 65V. In this case, the growth of a projection which has grown more than needed can be suppressed.

Moreover, although the examples in which the value of the driving voltage Vla was used as a value indicating the degree of a deterioration state were described in the first to seventh embodiments, various modifications may also be made. For example, it may be an average value of the driving voltage Vla for a predetermined time or it may be a change in the driving voltage Vla per time. Moreover, it is also possible to provide a light amount sensor, which detects the amount of light of the discharge lamp 90, as a state detecting section and to use the detected amount of light, the average value of the amount of light for a predetermined time, a change in the amount of light per time, and the like as a value indicating the degree of the deterioration state. Alternatively, it is also possible to provide a timer, which measures a cumulative lighting time of the discharge lamp 90, as a state detecting section and to use the measured cumulative lighting time as a value indicating the degree of the deterioration state.

Moreover, in the first to seventh embodiments, the example in which both the length of the period for which the first DC driving processing D1 is performed and the length of the period for which the second DC driving processing D2 is performed are changed or the example in which both the length of the period for which the first AC driving processing A1 is performed and the length of the period for which the second AC driving processing A2 is performed are changed was described. However, for example, when the thermal conditions (for example, easiness of an increase in the electrode temperature) of the first and second electrodes 92 and 93 of the discharge lamp 90 are largely different, it is possible to change either one of the length of the period for which the first DC driving processing D1 is performed and the length of the period for which the second DC driving processing D2 is performed or to change either one of the length of the period for which the first AC driving processing A1 is performed and the length of the period for which the second AC driving processing A2 is performed.

10. Circuit Configuration of Projector

Figure 11:
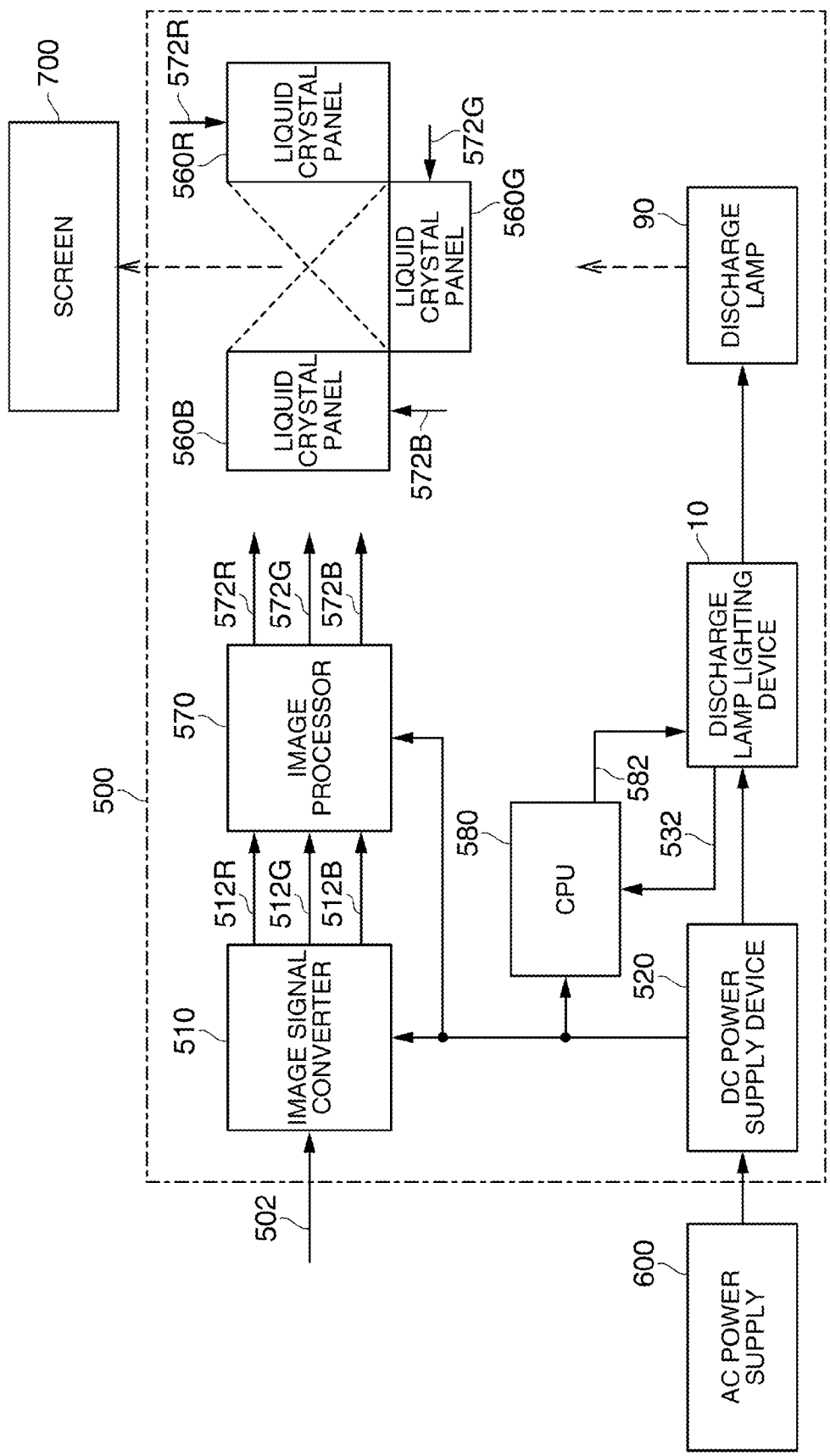
FIG. 11 is a view illustrating an example of the circuit configuration of a projector according to the present embodiment.

FIG. 11 is a view showing an example of the circuit configuration of the projector according to the present embodiment. The projector 500 includes not only the above-described optical system but also an image signal converter 510, a DC power supply device 520, the discharge lamp lighting device 10, the discharge lamp 90, the liquid crystal panels 560R, 560G, and 560B, and an image processor 570.

The image signal converter 510 generates image signals 512R, 512G, and 512B by converting an image signal 502 (for example, a brightness signal and a color difference signal or an analog RGB signal), which is input from the outside, into a digital RGB signal with a predetermined word length and then supplies the image signals 512R, 512G, and 512B to the image processor 570.

The image processor 570 performs image processing on the three image signals 512R, 512G, and 512B and outputs driving signals 572R, 572G, and 572B for driving the liquid crystal panels 560R, 560G, and 560B, respectively.

The DC power supply device 520 converts the AC voltage supplied from an external AC power supply 600 into the fixed DC voltage and then supplies the DC voltage to the image signal converter 510 located at the secondary side of a transformer (not shown but included in the DC power supply device 520), the image processor 570, and the discharge lamp lighting device 10 located at the primary side of the transformer.

At the start of the discharge lamp lighting device 10, the discharge lamp lighting device 10 generates a high voltage between electrodes of the discharge lamp 90 so that a discharge path is formed by dielectric breakdown. Then, the discharge lamp lighting device 10 supplies a driving current I for making the discharge lamp 90 keep the discharge.

The liquid crystal panels 560R, 560G, and 560B modulate the brightness of color light, which is incident on each liquid crystal panel through the optical system described previously, by the driving signals 572R, 572G, and 572B, respectively.

A CPU (Central Processing Unit) 580 controls an operation until the projector is turned off after the start of lighting in the projector. For example, a lighting command or a lights-out command may be output to the discharge lamp lighting device 10 through a communication signal 582. In addition, the CPU 580 may receive lighting information on the discharge lamp 90 from the discharge lamp lighting device 10 through a communication signal 532.

In the projector 500 configured as described above, it becomes easy to melt an electrode which is provided in the discharge lamp 90 and which becomes difficult to melt with the progress of a deterioration state of the electrode. As a result, deformation of the electrode of the discharge lamp can be suppressed.

In each of the above embodiments, the projector which uses three liquid crystal panels has been illustrated. However, the disclosure is not limited thereto and may also be applied to a projector which uses one, two, or four or more liquid crystal panels.

In each of the above embodiments, the transmissive projector has been illustrated. However, the disclosure is not limited thereto and may also be applied to a reflective projector. Here, 'transmissive' means that an electro-optical modulator as a light modulation unit is of a type in which light is transmitted therethrough like a transmissive liquid crystal panel, and 'reflective' means that an electro-optical modulator as a light modulation unit is of a type in which light is reflected therefrom like a reflective liquid crystal panel or a micromirror type modulator. As the micromirror type modulator, a DMD (digital micromirror device; trademark of Texas Instruments) may be used, for example. Also when the disclosure is applied to the reflective projector, the same effects as in the transmissive projector can be acquired.

The disclosure may be applied to both a front projection type projector, which projects a projected image from the observation side, and a rear projection type projector, which projects a projected image from the opposite side to the observation side.

In addition, the disclosure is not limited to the above-described embodiments, and various modifications may be made within the scope and spirit of the disclosure.

The disclosure includes substantially the same configuration (for example, a configuration with the same function, method, and result or a configuration with the same object and effect) as the configuration described in the embodiment. In addition, the disclosure includes a configuration which replaces a portion that is not essential in the configuration described in the embodiment. In addition, the disclosure includes a configuration capable of achieving the same operation and effect as in the configuration described in the embodiment or a configuration capable of achieving the same object. In addition, the disclosure includes a configuration in which a known technique is added to the configuration described in the embodiment.

For example, in the above embodiments, the alternating current (rectangular wave alternating current) which alternately repeats a period, for which a predetermined current value of the first polarity continues, and a period, for which a predetermined current value of the second polarity continues, was described as an example of the alternating current supplied as the driving current I. However, the alternating current supplied as the driving current I may also be an alternating current whose current value changes during a period for which the first polarity or the second polarity continues.

Moreover, for example, the length of DC time, the length of AC time, and the first and second frequencies may be arbitrarily set according to the specification of a discharge lamp. In addition, it is also possible to continuously change the length of DC time, the length of AC time, and the first and second frequencies. Therefore, it is manifestly intended that embodiments in accordance with the present disclosure be limited only by the claims and the equivalents thereof.

What is claimed is:

1. A discharge lamp lighting device comprising:
   a discharge lamp driving section that supplies a driving current to an electrode of a discharge lamp;
   a state detecting section that detects a deterioration state of the electrode; and
   a control unit that controls the discharge lamp driving section, the control unit configured to
   alternately perform a first DC driving processing and a first AC driving processing in a first section of the driving current;
   alternately perform a second DC driving processing and a second AC driving processing in a second section of the driving current different from the first section;
   perform control of supplying a first direct current as the driving current in the first DC driving processing, the first direct current starting from a first polarity and having a first polarity component;
   perform control of supplying a first alternating current as the driving current in the first AC driving processing, the first alternating current repeating a first polarity component and a second polarity component at a first frequency;
   perform control of supplying a second direct current as the driving current in the second DC driving processing, the second direct current starting from a second polarity and has a second polarity component;
   perform control of supplying a second alternating current as the driving current in the second AC driving processing, the second alternating current repeating a first polarity component and a second polarity component at a second frequency; and
   according to a progress of the deterioration state of the electrode, increase a length of at least one of: (i) a period for which the first DC driving processing is performed, and (ii) a period for which the second DC driving processing is performed.

2. The discharge lamp lighting device according to claim 1, wherein according to the progress of the deterioration state of the electrode, the control unit decreases a length of at least one of: (i) a period for which the first AC driving processing is performed, and (ii) a period for which the second AC driving processing is performed.

3. The discharge lamp lighting device according to claim 1, wherein when the deterioration state is smaller than a first reference value, the control unit changes the first frequency from a low frequency to a high frequency during a period for which the first AC driving processing is performed, and changes the second frequency from a low frequency to a high frequency during a period for which the second AC driving processing is performed.

4. The discharge lamp lighting device according to claim 1, wherein when the deterioration state is equal to or larger than a second reference value, the control unit changes the first frequency from a high frequency to a low frequency during a period for which the first AC driving processing is performed and changes the second frequency from a high frequency to a low frequency during a period for which the second AC driving processing is performed.

5. The discharge lamp lighting device according to claim 1, wherein when the deterioration state is smaller than a reference value, the control unit changes the first frequency from a low frequency to a high frequency during a period for which the first AC driving processing is performed, and changes the second frequency from a low frequency to a high frequency during a period for which the second AC driving processing is performed; and
   wherein when the deterioration state is equal to or larger than the reference value, the control unit changes the first frequency from a high frequency to a low frequency during the period for which the first AC driving processing is performed and changes the second frequency from a high frequency to a low frequency during the period for which the second AC driving processing is performed.

6. The discharge lamp lighting device according to claim 1, wherein the control unit increases at least one of the first frequency and the second frequency according to the progress of the deterioration state.

7. The discharge lamp lighting device according to claim 1, wherein
   the first alternating current begins with the first polarity component, and the first polarity component has a same polarity as the first polarity of the first direct current, and
   the second alternating current begins with the first polarity component, and the first polarity component has a same polarity as the first polarity of the first direct current.

8. The discharge lamp lighting device according to claim 1, wherein the second polarity of the second direct current is opposite from the first polarity of the first direct current.

9. The discharge lamp lighting device according to claim 1, wherein in accordance to the progress of deterioration state of the electrode, the control unit shortens the length of the periods for both the first DC driving processing and the second DC driving processing.

10. A projector comprising the discharge lamp lighting device according to claim 1.

11. A discharge lamp lighting device comprising:
    a discharge lamp driving section that supplies a driving current to an electrode of a discharge lamp;
    a state detecting section that detects a deterioration state of the electrode; and
    a control unit that controls the discharge lamp driving section, the control unit configured to
    alternately perform a first DC driving processing and a first AC driving processing in a first section of the driving current;
    alternately perform a second DC driving processing and a second AC driving processing in a second section of the driving current different from the first section;
    perform control of supplying a first direct current as the driving current in the first DC driving processing, the first direct current starting from a first polarity and having a first polarity component;
    perform control of supplying a first alternating current as the driving current in the first AC driving processing, the first alternating current repeating a first polarity component and a second polarity component at a first frequency;
    perform control of supplying a second direct current as the driving current in the second DC driving processing, the second direct current starting from a second polarity and has a second polarity component;

perform control of supplying a second alternating current as the driving current in the second AC driving processing, the second alternating current repeating a first polarity component and a second polarity component at a second frequency; and according to a progress of the deterioration state of the electrode, decrease a length of at least one of: (i) a period for which the first AC driving processing is performed, and (ii) a period for which the second AC driving processing is performed.

12. The discharge lamp lighting device according to claim 11, wherein when the deterioration state is smaller than a first reference value, the control unit changes the first frequency from a low frequency to a high frequency during a period for which the first AC driving processing is performed, and changes the second frequency from a low frequency to a high frequency during a period for which the second AC driving processing is performed.

13. The discharge lamp lighting device according to claim 11, wherein when the deterioration state is equal to or larger than a second reference value, the control unit changes the first frequency from a high frequency to a low frequency during a period for which the first AC driving processing is performed and changes the second frequency from a high frequency to a low frequency during a period for which the second AC driving processing is performed.

14. The discharge lamp lighting device according to claim 11, wherein the control unit increases at least one of the first frequency and the second frequency according to the progress of the deterioration state.

15. A projector comprising the discharge lamp lighting device according to claim 11.

16. A driving method for supplying a driving current to an electrode of a discharge lamp, comprising:

detecting a deterioration state of the electrode and performing a first DC driving and a first AC driving alternately in a first section of the driving current;

detecting the deterioration state of the electrode and performing a second DC driving and a second AC driving alternately in a second section of the driving current different from the first section;

supplying a first direct current as the driving current in the first DC driving, the first direct current starting from a first polarity and having a first polarity component;

supplying a first alternating current as the driving current in the first AC driving, the first alternating current repeating a first polarity component and a second polarity component at a first frequency;

supplying a second direct current as the driving current in the second DC driving, the second direct current starting from a second polarity and having a second polarity component;

supplying a second alternating current as the driving current in the second AC driving, the second alternating current repeating a first polarity component and a second polarity component at a second frequency; and according to a progress of the deterioration state of the electrode, increasing a length of at least one of: (i) a period for which the first DC driving is performed, and (ii) a period for which the second DC driving is performed.

17. A driving method for supplying a driving current to an electrode of a discharge lamp, comprising:

detecting a deterioration state of the electrode and performing a first DC driving and a first AC driving alternately in a first section of the driving current;

detecting the deterioration state of the electrode and performing a second DC driving and a second AC driving alternately in a second section of the driving current different from the first section;

supplying a first direct current as the driving current in the first DC driving, the first direct current starting from a first polarity and having a first polarity component;

supplying a first alternating current as the driving current in the first AC driving, the first alternating current repeating a first polarity component and a second polarity component at a first frequency;

supplying a second direct current as the driving current in the second DC driving, the second direct current starting from a second polarity and having a second polarity component;

supplying a second alternating current as the driving current in the second AC driving, the second alternating current repeating a first polarity component and a second polarity component at a second frequency; and according to a progress of the deterioration state of the electrode, decreasing a length of at least one of: (i) a period for which the first AC driving is performed, and (ii) a period for which the second AC driving is performed.

* * * * *